United States Patent
Jiang

(10) Patent No.: US 10,983,375 B2
(45) Date of Patent: Apr. 20, 2021

(54) DISPLAY PANEL, METHOD FOR TESTING CELL GAP THEREOF, AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventor: Xuebing Jiang, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 127 days.

(21) Appl. No.: 15/749,873

(22) PCT Filed: Aug. 10, 2017

(86) PCT No.: PCT/CN2017/096746
§ 371 (c)(1),
(2) Date: Feb. 2, 2018

(87) PCT Pub. No.: WO2018/033007
PCT Pub. Date: Feb. 22, 2018

(65) Prior Publication Data
US 2019/0004345 A1    Jan. 3, 2019

(30) Foreign Application Priority Data
Aug. 18, 2016    (CN) .......................... 201610687615.5

(51) Int. Cl.
*G02B 27/00*    (2006.01)
*G02F 1/13*    (2006.01)
(Continued)

(52) U.S. Cl.
CPC ........... *G02F 1/1309* (2013.01); *G02B 27/00* (2013.01); *G02F 1/1339* (2013.01); *G02F 1/133512* (2013.01)

(58) Field of Classification Search
CPC ................. G03F 1/1309; G02F 1/1339; G02F 1/133512; G02B 5/00; G02B 5/003; G02B 5/22; G02B 27/00
(Continued)

(56) References Cited

U.S. PATENT DOCUMENTS 6,628,389 B1    9/2003    Akada et al.
6,636,322 B1    10/2003    Terashita
(Continued)

FOREIGN PATENT DOCUMENTS

CN    1307247 A    8/2001
CN    1326543 A    12/2001
(Continued)

OTHER PUBLICATIONS

First Office Action for Chinese Patent Application No. 201610687615.5 dated Sep. 18, 2018.
(Continued)

*Primary Examiner* — Thong Q Nguyen
(74) *Attorney, Agent, or Firm* — Calfee, Halter & Griswold LLP

(57) ABSTRACT

A display panel, a method for testing a cell gap thereof, and a display device are disclosed. The display panel includes a first substrate and a second substrate arranged opposite to each other, wherein a light shielding layer is provided on a side of the first substrate close to the second substrate, a portion of the light shielding layer located in a peripheral region includes a plurality of opening areas arranged at intervals, each opening area being provided with a light transmissive layer; and wherein the second substrate has a
(Continued)

light transmissive area, an orthographic projection of the light transmissive layer on the second substrate at least partly overlaps with the light transmissive area on the second substrate.

12 Claims, 4 Drawing Sheets

(51) Int. Cl.
*G02F 1/1339* (2006.01)
*G02F 1/1335* (2006.01)

(58) Field of Classification Search
USPC .................................................. 359/601, 614
See application file for complete search history.

(56) References Cited

U.S. PATENT DOCUMENTS

| | | | | |
|---|---|---|---|---|
| 7,714,961 B2* | 5/2010 | Bae | ........................ | G02F 1/1341 349/110 |
| 8,807,768 B2* | 8/2014 | Byeon | ................ | G02B 27/0018 359/601 |
| 8,911,097 B2* | 12/2014 | Sung | ..................... | G02F 1/1335 359/609 |
| 2001/0050771 A1 | 12/2001 | Dohi | | |
| 2010/0149463 A1* | 6/2010 | Shimizu | .............. | G02F 1/13394 349/106 |
| 2010/0289992 A1* | 11/2010 | Nojiri | ................ | G02F 1/133512 349/106 |
| 2011/0007398 A1* | 1/2011 | Lim | ...................... | H05K 9/0054 359/614 |
| 2014/0078415 A1* | 3/2014 | Tanabe | .............. | G02F 1/133509 349/12 |
| 2016/0216542 A1* | 7/2016 | Yoshida | ................. | G02F 1/1337 |
| 2017/0053607 A1* | 2/2017 | Lin | ......................... | G09G 3/344 |
| 2019/0258107 A1* | 8/2019 | Fujii | ................. | G02F 1/133502 |

FOREIGN PATENT DOCUMENTS

| | | |
|---|---|---|
| CN | 1664536 A | 9/2005 |
| CN | 103176297 A | 6/2013 |
| CN | 104166254 A | 11/2014 |
| CN | 106054112 A | 10/2016 |
| JP | 3358578 B2 | 10/2002 |

OTHER PUBLICATIONS

Search Report for International Application No. PCT/CN2017/096746 dated Oct. 27, 2017.

* cited by examiner

DISPLAY PANEL, METHOD FOR TESTING CELL GAP THEREOF, AND DISPLAY DEVICE

RELATED APPLICATIONS

The present application is the U.S. national phase entry of PCT/CN2017/096746, with an international filing date of Aug. 10, 2017, which claims the priority of Chinese patent application No. 201610687615.5 filed on Aug. 18, 2016, the entire disclosure of which is incorporated herein by reference.

TECHNICAL FIELD

The present disclosure relates to the field of display technology, particularly to a display panel, a method for testing a cell gap thereof, and a display device.

BACKGROUND

Substrates in the thin film transistor liquid crystal display (TFT-LCD) generally comprise a color film substrate and an array substrate. In a cell aligning process, the two substrates are bonded all around by sealant, and in the meanwhile, the sealant can seal liquid crystals in the cell.

There is a problem in the TFT-LCD, i.e., the cell gap in the peripheral area is not uniform. That is to say, the matching problem caused by the film thickness, the photo spacer, the sealant and the like at the edge of the display area may result in non-uniformity of the cell gap in the peripheral area of the display device. One of the consequences due to the non-uniform cell gap is the display failure at the periphery, such as peripheral yellowish, peripheral blueish etc. Generally, the cell gap distribution of the display area (both inside and at edge) can be tested by a cell gap test device using an optical test method. The cell gap distribution can be in correspondence with the yellowish (or blueish) degree of the peripheral. However, conventionally, only the cell gap of the display area can be tested, and there is no effective method to analyze the cell gap in the peripheral area.

SUMMARY

With respect to the traditional defects, the present disclosure provides a display panel, a method for testing a cell gap thereof, and a display device, which can test the cell gap distribution in an area shielded by a light shielding layer in the peripheral area of a display panel, thereby determining the trend of the cell gap distribution in the peripheral area effectively, so as to achieve the object of uniform cell gap in the peripheral area by changing the design.

In a first aspect, the present disclosure provides a display panel to be tested, comprising: a first substrate and a second substrate arranged opposite to each other, wherein a light shielding layer is provided on a side of the first substrate close to the second substrate, a portion of the light shielding layer located in a peripheral region comprises a plurality of opening areas arranged at intervals, each opening area being provided with a light transmissive layer; and wherein the second substrate has a light transmissive area, an orthographic projection of the light transmissive layer on the second substrate at least partly overlaps with the light transmissive area on the second substrate.

In an embodiment, the light transmissive layer corresponds to an area on the second substrate without metal wires.

In an embodiment, the light transmissive layer and the light shielding layer are arranged alternately.

In an embodiment, the light transmissive layer arranged in each opening area is made of a same material as a filter in a display area.

In an embodiment, a size of the light transmissive layer arranged in each opening area is approximately equal to a size of a filter corresponding to each sub-pixel unit in the display area.

In an embodiment, the display panel further comprises: a sealant for bonding the first substrate and the second substrate.

In an embodiment, the first substrate further comprises: a color filter layer arranged on a side of the substrate, a protective layer arranged on a side of the color filter layer away from the substrate, and a photo spacer arranged on a side of the protective layer away from the color filter layer.

In a second aspect, the present disclosure provides a display panel, comprising: a first substrate and a second substrate arranged opposite to each other, wherein a light shielding layer is provided on a side of the first substrate close to the second substrate, a portion of the light shielding layer located in a peripheral area comprises a plurality of first light shielding portions arranged at intervals, two adjacent first light shielding portions are connected by a second light shielding portion, wherein the second substrate has a light transmissive area, an orthographic projection of the second light shielding portion on the second substrate at least partly overlaps with the light transmissive area on the second substrate, the second light shielding portion is a laminated structure comprising a light transmissive sub-layer and a light shielding sub-layer, wherein the light shielding sub-layer is made of a same material as the first light shielding portion; and a thickness of the first light shielding portion is smaller than a thickness of the second light shielding portion.

In an embodiment, the second light shielding portion corresponds to an area on the second substrate without metal wires.

In an embodiment, the light transmissive sub-layer is made of a same material as a filter in a display area.

In an embodiment, a size of the light transmissive sub-layer is approximately equal to a size of a filter corresponding to each sub-pixel unit in the display area.

In a third aspect, the present disclosure provides a method for testing a cell gap of a display panel, the display panel comprising a first substrate and a second substrate arranged opposite to each other, a side of the first substrate close to the second substrate being provided with a light shielding layer, the light shielding layer comprising a light shielding layer located in a display area and a light shielding layer located in a peripheral area around the display area, the method comprising: etching the light shielding layer located in the peripheral area, to form a plurality of opening areas arranged at intervals, an orthographic projection of each opening area on the second substrate at least partly overlapping with a light transmissive area on the second substrate; forming a light transmissive layer in each of the plurality of opening areas; and using a cell gap test device to detect a cell gap distribution in the peripheral area through the light transmissive layer.

In an embodiment, after using a cell gap test device to detect a cell gap distribution in the peripheral area through the light transmissive layer, the method further comprises:

using a laser repair method to bombard the light shielding layer at the periphery of the light transmissive layer with laser, so as to enable the light shielding layer to shield the light transmissive layer.

In an embodiment, the light shielding layer is made of black resin and the light transmissive layer is made of filter resin.

In an embodiment, the light transmissive layer corresponds to an area on the second substrate without metal wires.

In an embodiment, forming a light transmissive layer in each of the plurality of opening areas comprises:

forming a filter in each opening area.

In a fourth aspect, the present disclosure provides a display device, comprising any of the above display panels.

The present disclosure provides a display panel, a method for testing a cell gap thereof, and a display device. By forming a plurality of opening areas arranged at intervals on the light shielding layer in the peripheral area of the first substrate, arranging a light transmissive layer in each opening area, and enabling an orthographic projection of the light transmissive layer on the second substrate at least partly overlaps with the light transmissive area on the second substrate, the cell gap distribution in the peripheral area can be tested throught a plurality of light transmissive layers arranged in the peripheral area based on the cell gap test principle, thereby determining the trend of the cell gap distribution in the peripheral area effectively, so as to achieve the object of uniform cell gap in the peripheral area by changing the design.

BRIEF DESCRIPTION OF THE DRAWINGS

In order to explain technical solutions in the embodiments of the present disclosure more explicitly, next, the drawings to be used in describing the embodiments will be introduced briefly. Apparently, the drawings described below are only some embodiments of the present disclosure. The ordinary skilled person in the art, on the premise of not paying any inventive efforts, can also obtain other drawings based on these drawings.

DETAILED DESCRIPTION OF THE EMBODIMENTS

Next, technical solutions in the embodiments of the present disclosure will be described clearly and completely in conjunction with the drawings. Apparently, the embodiments described are only a part of rather than all of the embodiments of the present disclosure. Based on the embodiments in the present disclosure, all other embodiments obtained by the ordinary skilled person in the art on the premise of not paying any inventive efforts shall fall within the protection scope of the present disclosure.

REFERENCE SIGNS

101—first substrate;
102—light shielding layer;
103—display area;
104—first color filter;
105—second color filter;
106—third color filter;
107—light transmissive layer;
108—protection layer;
109—photo spacer;
110—sealant;
111—gate line layer metal;
112—photo spacer pillow;
113—second substrate;
114—peripheral area;
115—light transmissive area;
121—first light shielding portion;
122—second light shielding portion;
201—light transmissive sub-layer; and
202—light shielding sub-layer.

Figure 1:
FIG. 1 is a vertical and structural schematic view of a relevant display panel.
Figure 2:
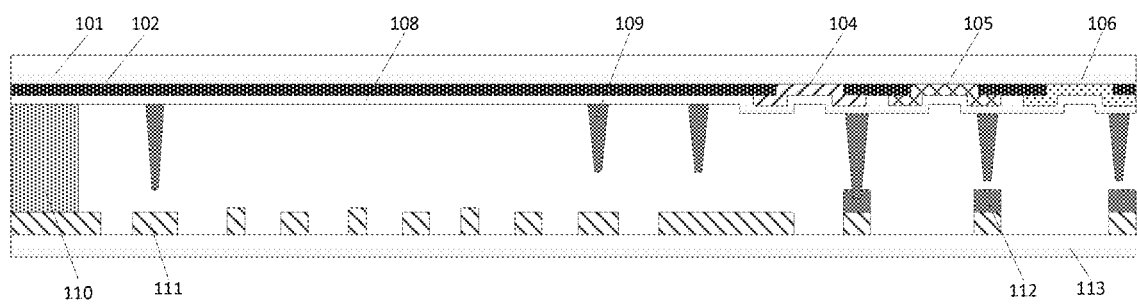
FIG. 2 is a sectional schematic view along A-A' of the display panel as shown in FIG. 1.

As shown in FIG. 1 and FIG. 2, the basic structure of the color film substrate can be divided into a display area 103 and a peripheral area located around the display area 103. The black matrix (BM) of the display area is in an array distribution, located between the filters (the first filter 104, the second filter 105 and the third filter 106 as shown in FIG. 2) corresponding to each sub-pixel unit respectively in the display area, for shielding light leakage caused by the metal wires on the array substrate. The light shielding layer 102 (i.e., the black matrix) in the peripheral area is in a flaky distribution, because this area does not have to transmit light.

Figure 3:
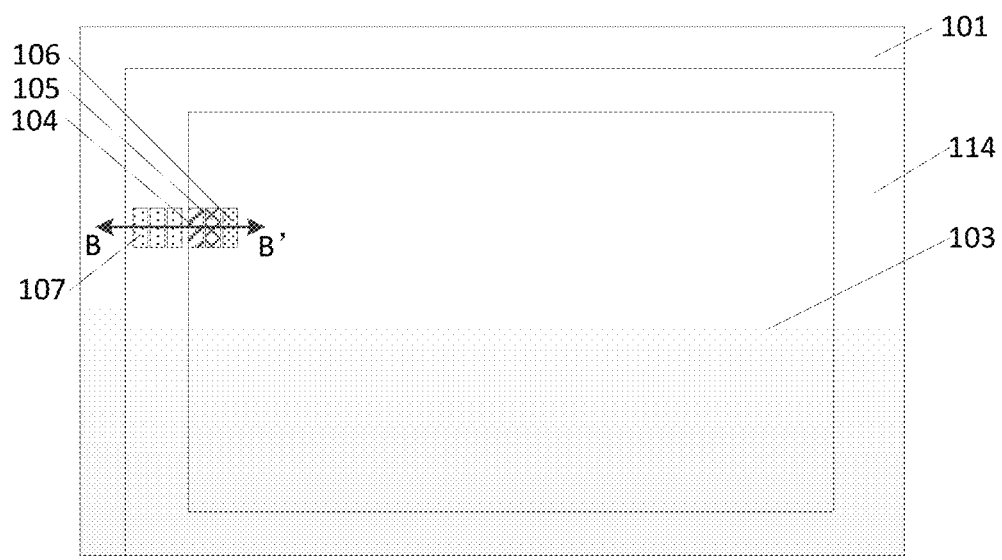
FIG. 3 is a vertical and structural schematic view of a display panel in an embodiment of the present disclosure.
Figure 4:
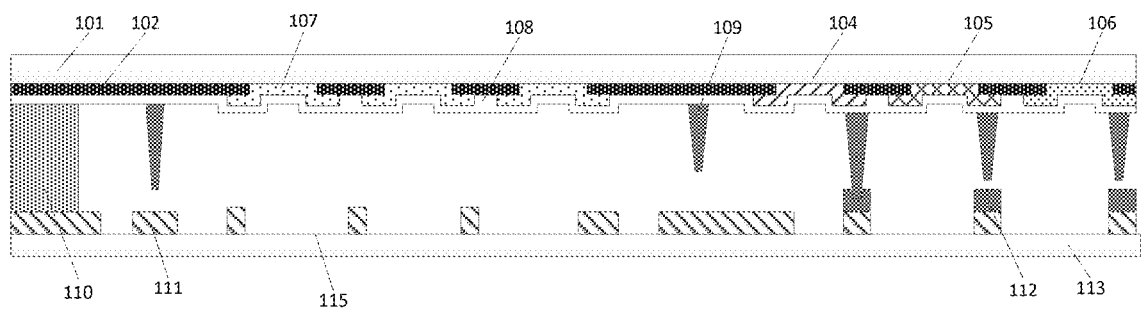
FIG. 4 is a sectional schematic view along B-B' of the display panel as shown in FIG. 3.

FIG. 3 is a vertical and structural schematic view of a display panel in an embodiment of the present disclosure. FIG. 4 is a sectional schematic view along B-B' of the display panel as shown in FIG. 3. Referring to FIG. 3 and FIG. 4, the display panel comprises: a first substrate and a second substrate arranged opposite to each other. A light shielding layer 102 is arranged on a side of the first substrate 101 close to the second substrate. A portion of the light shielding layer 102 located in the peripheral area comprises a plurality of opening areas arranged at intervals. Each opening area is provided with a light transmissive layer.

As shown in FIG. 4, the light shielding layer in the peripheral area 114 comprises: a plurality of opening areas arranged at intervals, each opening area being provided with a light transmissive layer 107. The second substrate has a light transmissive area 115. An orthographic projection of the light transmissive layer 107 on the second substrate at least partly overlaps with the light transmissive area 115 on the second substrate.

The material of the light shielding layer can be black resin, and the material of the light transmissive layer can be filter resin. For example, the materials of the light shielding layer and the light transmissive layer can be selected according to Table 1. (BM: black matrix; RGB: filters corresponding to red, green and blue; OC: overcoat)

TABLE 1

| Structure | Material | Function | Example | Remark |
|---|---|---|---|---|
| BM | Resin + black pigment | Shielding light | Acrylic resin + carbon | All are negative adhesive, and the portion irradiated by light in the masking process is kept on the substrate. |
| RGB | Resin + color pigment | Transmissive Coloring | Methyl acrylic resin + color pigment | |
| OC | Resin | Planarization & protection layer | Acrylic resin | |

Table 1

For example, the display panel in this embodiment can be an LCD display panel. The display panel can comprise an array substrate and a color film substrate arranged opposite to each other, i.e., the first substrate in this embodiment is a color film substrate and the second substrate is an array substrate. A light shielding layer is arranged on the color film substrate. The light shielding layer located in the display area is in an array distribution, while the light shielding layer located in the peripheral area comprises a plurality of opening area arranged at intervals, wherein a light transmissive layer is formed in the opening area.

Understandably, as shown in FIG. 4, the second substrate 113 comprises a gate line layer metal 111 formed on the second substrate. Apparently, in addition to the structure as shown in FIG. 4, it can further comprise other composite parts. For instance, a gate insulating layer, an active layer, a source, a drain, a data line, a pixel electrode or a common electrode and so on can be formed on the gate line layer metal 111 successively, which will not be defined in this embodiment.

The cell gap test principle is described briefly herein. When light is incident on the liquid crystal unit through the first substrate, the linear polarized light is changed into elliptical light, because the liquid crystal as anisotropic substance has birefringence. The light that passes through the liquid crystal cell has a phase deviation in both x and y directions, wherein the amount of phase deviation depends on the distance d and the refractive index Δn between the liquid crystal units. The specific relation is as follows: Re.=Δn·d, wherein Re. is the birefringent phase difference, d is the cell gap, and Δn is the refractive index. When the elliptical light is further emitted out through the second substrate, the cell gap can be calculated using the above formula.

This embodiment forms opening areas arranged at intervals on the light shielding layer of the peripheral area, and forms a light transmissive layer 107 in the opening area. Moreover, the light transmissive layer 107 at least partly overlaps with the light transmissive area 115 on the second substrate. Since the light shielding layer located in the peripheral area comprises a light transmissive layer, light can pass through the liquid crystal layer from the first substrate via the light transmissive layer in the light shielding layer located in the peripheral area and reach the second substrate.

Based on the structure of the display panel in this embodiment, the cell gap distribution in the peripheral area can be tested according to the cell gap test principle. Specifically, the cell gaps at several key points located in the peripheral area are measured and compared according to the cell gap test principle. If the deviation is within a preset range, it will be determined that the cell gap in the peripheral area is uniform. If the deviation is beyond the preset range, it will be determined that the cell gap in the peripheral area is non-uniform, and the position where the cell gap in the peripheral area is non-uniform can be compensated so as to achieve the object of uniform cell gap in the peripheral area.

This embodiment forms a plurality of opening areas arranged at intervals in the light shielding layer on the peripheral area of the first substrate, arranges a light transmissive layer in each opening area, and enables an orthographic projection of the light transmissive layer on the second substrate at least partly overlap with the light transmissive area on the second substrate. The cell gap distribution in the peripheral area can be tested through a plurality of light transmissive layers arranged in the peripheral area based on the cell gap test principle, thereby determining the trend of the cell gap distribution in the peripheral area effectively, so as to achieve the object of uniform cell gap in the peripheral area by changing the design.

In an embodiment, the light transmissive layer 107 corresponds to an area on the second substrate without metal wires, thereby enabling light to reach the second substrate through the light transmissive layer 107 easily, so as to test the cell gap of the liquid crystal cell.

As an example, as shown in FIG. 4, the light transmissive layer 107 and the light shielding layer 102 are arranged alternately.

Specifically, as shown in FIG. 4, a light shielding layer 102 is arranged between every two light transmissive layers 107, i.e., the light transmissive layers 107 located in the peripheral area and the light shielding layers 102 are arranged alternately. The light shielding layer at the periphery of the light transmissive layer 107 is bombarded using a laser repair method, such that the light shielding layer forms shielding to the filter, so as to avoid bright dot failure possibly caused by the display panel with the above structure. It should be noted that the laser repair method can solve the problem of light leakage caused by arranging the light transmissive layer 107 in the peripheral area, so as to avoid bright dot failure of the display panel caused by light leakage in the peripheral area.

In an embodiment, the light transmissive layer arranged in each opening area is a filter.

Understandably, the color of the filter corresponding to each opening area can be one of a plurality of predetermined colors. For example, it can be a red filter, a blue filter, a green filter or the like.

As shown in FIG. 4, if the light transmissive layer 107 formed in each opening area is a filter, the filter located in the peripheral area and the filter of the same color located in the display area can be formed simultaneously using one patterning process (the first color filter 104, the second color filter 105 or the third color filter 106 as shown in FIG. 4). For example, after the light shielding layer 102 on one side of the first substrate 101 is formed, the light transmissive layer located in the display area and the light transmissive layer located in the peripheral area are etched simultaneously, so as to form an opening area corresponding to the light transmissive layer located in the display area and an opening area corresponding to the light transmissive layer located in the peripheral area. Then, filters of the same color are formed in the opening areas simultaneously through one patterning process. In this way, both the process steps and the cost can be saved.

The size of the filter corresponding to each opening area is approximately equal to the size of the filter corresponding to each sub-pixel unit in the display area.

In this embodiment, the size of the filter corresponding to each opening area is equal to the size of the filter corresponding to each sub-pixel unit in the display area. Thus, the two can share one mask plate without having to manufacture a new mask plate, which is benefit for saving the cost.

As shown in FIG. 4, the display panel further comprises: a sealant 110 for bonding the first substrate and the second substrate. The sealant 110 forms an enclosed space together with the first substrate and the second substrate, wherein the enclosed space is filled with liquid crystals.

It should be noted that light transmissive layers are arranged on the light shielding layers at different positions of the peripheral area located around the display area. For instance, as shown in FIG. 3, a plurality of light transmissive layers can not only be arranged at different positions in the left peripheral area, but also can be arranged at different positions in the upper, right and lower peripheral areas. In this way, the cell gaps at different positions in the peripheral area can be detected, so as to enable a more comprehensive monitoring of the cell gap distribution in the peripheral area.

As shown in FIG. 4, the first substrate further comprises: a color filter layer arranged on a side of the first substrate, a protection layer 108 arranged on a side of the color filter layer away from the first substrate, and a photo spacer 109 arranged on a side of the protection layer 108 away from the color filter layer. Correspondingly, a photo spacer pillow 112 can be also arranged at a position on the second substrate corresponding to the photo spacer 109.

Specifically, the color filter layer comprises a first color filter 104, a second color filter 105 and a third color filter 106 arranged repeatedly in the display area. The protection layer 108 is used for protecting the light transmissive layer 107 and the color filters 104, 105, 106. The photo spacer 109 arranged on the first substrate and the photo spacer pillow 112 arranged on the second substrate are used for supporting the liquid crystal cell gap.

Figure 5:
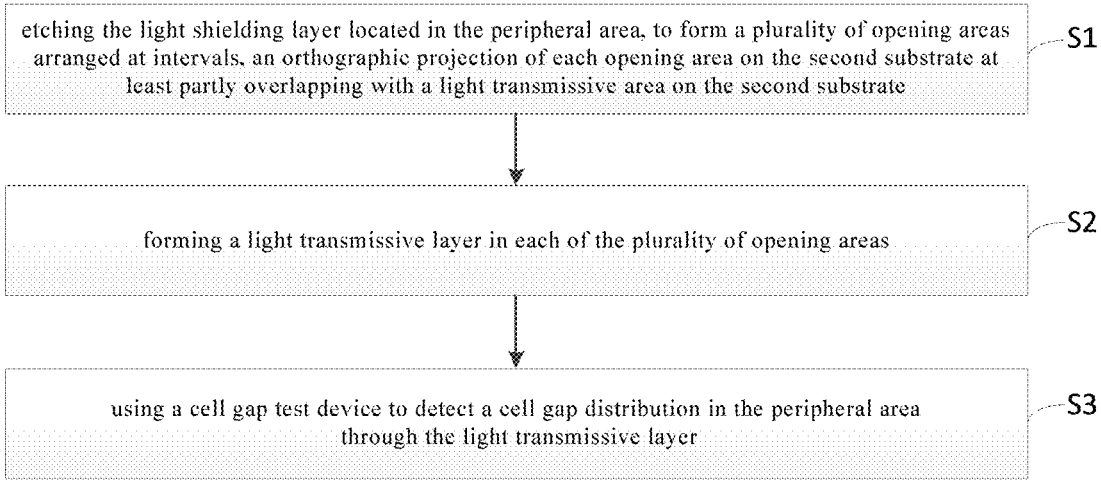
FIG. 5 is a flow chart of a method for testing a cell gap of a display panel in an embodiment of the present disclosure.

In an embodiment, a method for testing a cell gap of a display panel is provided. The display panel comprises a first substrate and a second substrate arranged opposite to each other, a side of the first substrate close to the second substrate being provided with a light shielding layer, the light shielding layer comprising a light shielding layer located in the display area and a light shielding layer located in the peripheral area around the display area. FIG. 5 shows a schematic view of the flow chart for steps in the method for testing a cell gap of a display panel, the method comprising:

Step S1: etching the light shielding layer located in the peripheral area, so as to form a plurality of opening areas arranged at intervals; an orthographic projection of each opening area on the second substrate at least partly overlapping with a light transmissive area on the second substrate.

Specifically, the light shielding layer located in the peripheral area can be etched by photoetching, so as to form a plurality of opening areas arranged at intervals, and enable an orthographic projection of each opening area on the second substrate at least partly overlap with a light transmissive area on the second substrate, so as to perform cell gap test through the opening area.

Step S2: forming a light transmissive layer in each of the plurality of opening areas.

Specifically, a layer of light transmissive material is coated on one side of the light shielding layer away from the substrate, and the layer of light transmissive material is photoetched, so as to form a light transmissive layer in the opening area located in the peripheral area.

Step S3: using a cell gap test device to detect a cell gap distribution in the peripheral area through the light transmissive layer.

In this embodiment, a plurality of opening areas arranged at intervals are formed on the light shielding layer located in the peripheral area of the first substrate, a light transmissive layer is arranged in each opening area, and the light transmissive layer is enabled to at least partly overlap with the light transmissive area on the second substrate. The cell gap distribution at different positions of the peripheral area can be tested through a plurality of light transmissive layers arranged in the peripheral area based on the cell gap test principle, thereby determining the trend of cell gap distribution at different positions in the peripheral area effectively, so as to achieve the object of uniform cell gap in the peripheral area by changing the design.

Figure 6:
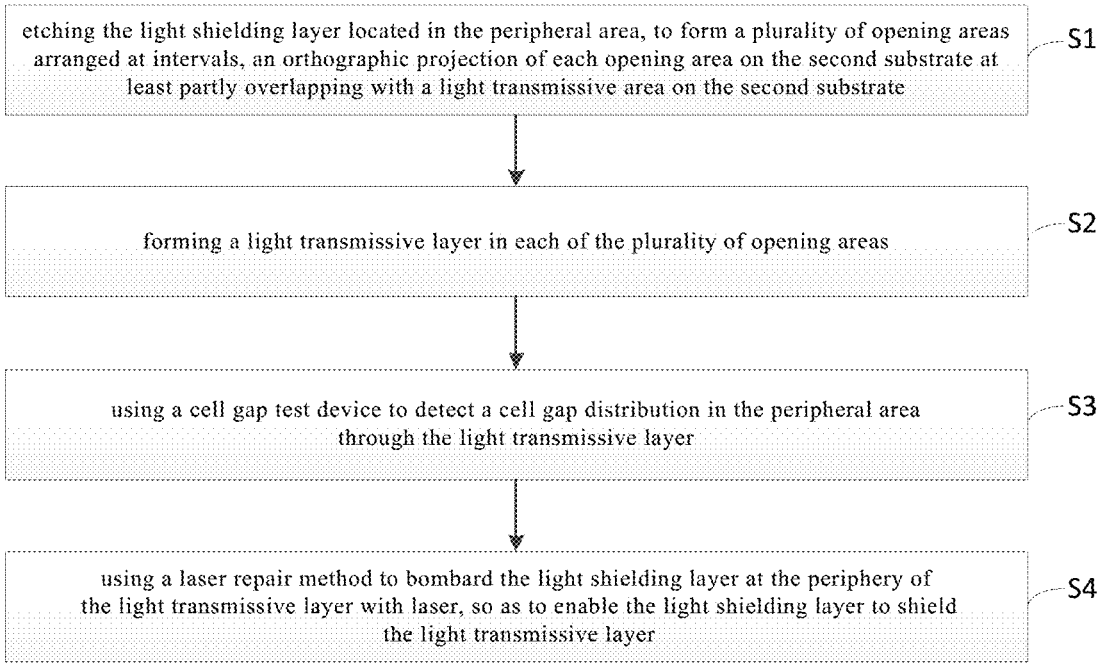
FIG. 6 is a flow chart of a method for testing a cell gap of a display panel in another embodiment of the present disclosure.

As shown in FIG. 6, after the step S3, it can further comprise a step of: Step S4: using a laser repair method to bombard the light shielding layer at the periphery of the light transmissive layer with laser, so as to enable the light shielding layer to shield the light transmissive layer.

Figure 7:
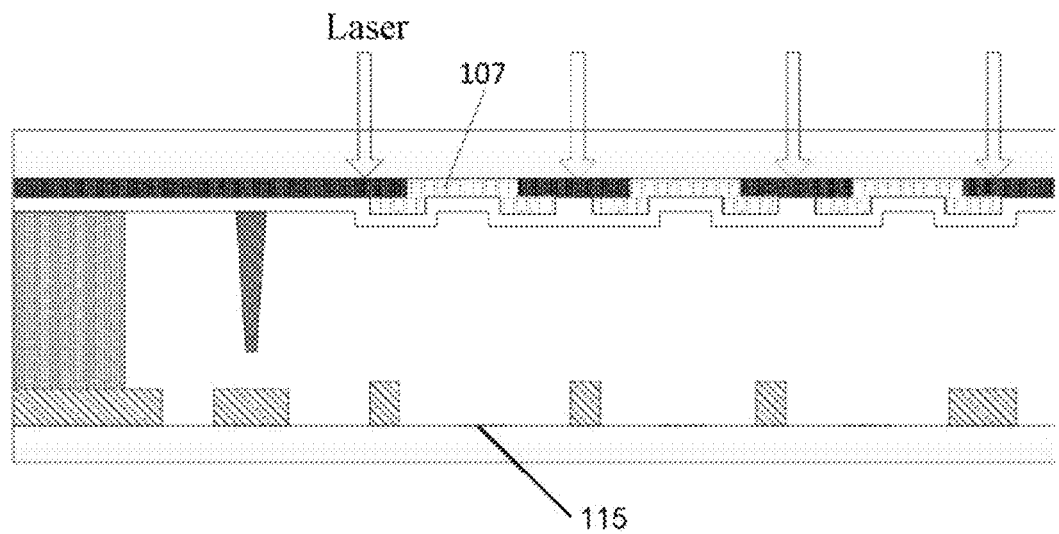
FIG. 7 is a schematic view for bombarding the light shielding layer with laser in another embodiment of the present disclosure.
Figure 8:
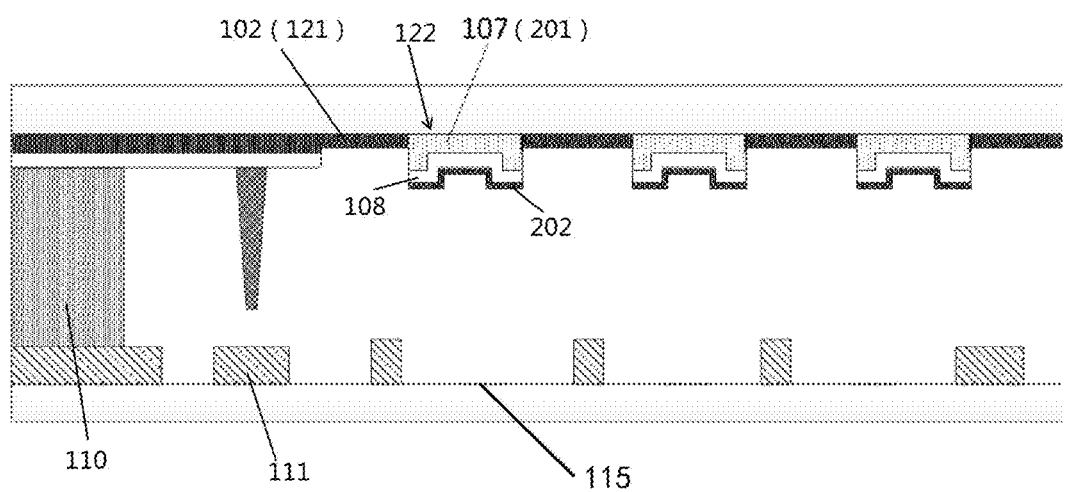
FIG. 8 is a schematic view of a display panel formed by bombarding the light shielding layer with laser in another embodiment of the present disclosure.

Specifically, as shown in FIG. 7, the laser repair method is used to bombard the light shielding layer at the periphery of the light transmissive layer 107 with laser, so as to enable the light shielding layer to shield the light transmissive layer 107, as shown in FIG. 8. In this way, after the cell gap test is finished, the laser repair method is used to enable the light transmissive layer to be covered by the light shielding layer, thereby avoiding brightness spot failure caused by the light transmissive layer 107.

Specifically, in the portion of the light shielding layer 102 irradiated by laser, the protection layer 108 arranged on the surface of the light shielding layer 102 is volatilized firstly. Subsequently, the powder generated by volatilization of the exposed light shielding layer 102 is attached on the protection layer 108 below the light transmissive layer 107.

As shown in FIG. 8, the portion of the light shielding layer of the repaired display panel located in the peripheral area comprises a plurality of first light shielding portions 121 (the original light shielding layer 102) arranged at intervals, wherein two adjacent first light shielding portions 121 are connected by a second light shielding portion 122. The second light shielding portion 122 at least partly overlaps with the light transmissive area 115 on the second substrate. In the embodiment as shown in FIG. 8, the second light shielding portion 122 is a laminated structure of three layers—a light transmissive sub-layer 201 (the original light transmissive layer 107), the residual portion of the protection layer 108, and a light shielding sub-layer 202, wherein the materials of the light shielding sub-layer 202 and the first light shielding portion 121 are the same. From FIG. 8 it can be seen that because part of particles in the original light shielding layer 102 is volatilized in the laser repair process, the thickness of the first light shielding portion 121 is smaller than the thickness of the light transmissive sub-layer 201 (the original light transmissive layer 107).

It should be noted that although the light transmissive layer and the light shielding layer in FIG. 7 are covered with the protection layer 108, it is not obligatory. In such a case, in the repaired display panel, the second light shielding portion 122 is a laminated structure of two layers—a light transmissive sub-layer 201 (the original light transmissive layer 107) and a light shielding sub-layer 202, wherein the materials of the light shielding sub-layer 202 and the first light shielding portion 121 are the same.

In an embodiment, the light transmissive layer corresponds to an area on the second substrate without metal wires. Thus, light can pass through the second substrate via the light transmissive layer more easily, so as to enable a cell gap test on the liquid crystal cell.

In an embodiment, forming a light transmissive layer in each of the plurality of opening areas comprises: forming a filter in each of the plurality of opening areas.

Understandably, the color of the filter corresponding to each opening area can be one of a plurality of predetermined colors. For example, it can be a red filter, a blue filter, a green filter, or the like.

In this embodiment, if the light transmissive layer formed in each opening area is a filter, the filter located in the peripheral area and the filter of the same color located in the display area can be formed simultaneously using one patterning process. For example, after the light shielding layer is formed on one side of the substrate, the light shielding layer located in the display area and the light shielding layer located in the peripheral area are etched simultaneously, so as to form the opening areas. Further, filters of the same color are formed in the opening areas simultaneously by one patterning process. In this way, the process steps and the cost can be both saved.

The method for testing a cell gap of a display panel provided by the above embodiment can not only provide data basis for design in the design phase, but also can monitor the cell gap condition in the peripheral area of the product in real time in the manufacturing phase, so as to make prediction about the peripheral area failure (such as peripheral area yellowish) that may occur to the product in the manufacturing phase, thereby avoiding possible rejection ratio and cost loss. For instance, for the display panel in which the cell gap distribution in the peripheral area is not uniform, the modules will not be manufactured after the cutting process, or degrading treatment is performed. This method can reduce material waste to some extent and help to sort management of the products.

Any of the above display panels and the method for testing a cell gap of any display panel can be applicable for the manufacturing process of various types of TFT-LCDs, e.g., Twisted Nematic (TN), Advanced Super Dimension Switch (ADS), Vertical Alignment (VA), and In-Plane Switching (IPS).

An embodiment of the present disclosure provides a display device, comprising: any of the above display panels. The display device can be any product or component with a display function such as a liquid crystal display panel, a mobile phone, a panel computer, a television, a laptop, a digital photo frame, a navigator etc. Because the display device comprises any of the above display panels, it can solve the same technical problem and achieve the same technical effect.

It should be noted that the azimuth or position relations indicated by words such as "upper", "lower" are azimuth or position relations as shown in the figures. These words are only for the convenience of describing the present disclosure, rather than indicating or implying that the device or element as referred must have a particular azimuth or constructed and operated in the particular azimuth. Hence, they could not be interpreted as limitations to the present disclosure. Unless otherwise expressly defined, the words such as "mount", "connected", "connection" should be extensively understood. For example, it can be either a fixed connection or a detachable connection or an integrated connection. It can be either a mechanical connection, or an electrical connection. Alternatively, it can be either connected directly or connected indirectly through an intermediate medium. Besides, it can be a communication within two elements. For the ordinary skilled person in the art, the specific meanings of the above words in the present disclosure can be understood based on specific conditions.

It should be further noted that in this disclosure, the words such as "first" and "second" are only used for distinguishing one entity or operation from another entity or operation, but not necessarily requiring or implying that there is any actual relation or order between these entities or operations. Moreover, the words of "comprise", "include" and the like intend to cover non-exclusive inclusion, thereby enabling the process, method, article or device that comprises a series of elements to not only comprise those elements but also comprise other elements not explicitly listed, or further comprise inherent elements of such a process, method, article or device. In the absence of more limitations, the element defined by the wording of "comprising a . . . " does not exclude presence of an additional same element in the process, method, article or device that comprises said element.

The above embodiments are only used for explaining technical solutions of the present disclosure rather than limitations to it. Although the present disclosure has been explained in detail with reference to the preceding embodiments, the ordinary skilled person in the art should understand that he/she still can make amendment to the technical solutions recited in the preceding embodiments, or make equivalent replacement to some of the technical features therein. However, these amendments or replacements would not make the essence of the corresponding technical solution to depart from the spirit and the scope of the technical solution of each embodiment of the present disclosure.

The invention claimed is:

1. A display panel, comprising: a first substrate and a second substrate arranged opposite to each other,
    wherein a light shielding layer is provided on a side of the first substrate close to the second substrate, the light shielding layer comprising a portion located in a display area and a portion located in a peripheral area around the display area,
    wherein the portion of the light shielding layer located in the display area is arranged in an array distribution and located between filters corresponding to sub-pixel units in the display area;
    wherein the portion of the light shielding layer located in the peripheral area comprises a plurality of opening areas arranged at intervals, each opening area being provided with a light transmissive layer;
    wherein the second substrate has a light transmissive area, an orthographic projection of the light transmissive layer on the second substrate at least partly overlaps with the light transmissive area on the second substrate; and
    wherein the light transmissive layer arranged in each opening area is made of a same material as the filters located in the display area.

2. The display panel according to claim 1, wherein the light transmissive layer corresponds to an area on the second substrate without metal wires.

3. The display panel according to claim 2, wherein the display panel further comprises a sealant for bonding the first substrate and the second substrate.

4. The display panel according to claim 1, wherein a size of the light transmissive layer arranged in each opening area is approximately equal to a size of each filter corresponding to each sub-pixel unit in the display area.

5. The display panel according to claim 1, wherein the display panel further comprises a sealant for bonding the first substrate and the second substrate.

6. A display device, comprising the display panel as claimed in claim 1.

7. A display panel, comprising: a first substrate and a second substrate arranged opposite to each other, wherein a light shielding layer is provided on a side of the first substrate close to the second substrate, the light shielding layer comprises a portion location in a display area and a portion located in a peripheral area around the display area, the portion of the light shielding layer located in the display area is arranged in an array distribution and located between filters corresponding to sub-pixel units in the display area, the portion of the light shielding layer located in the peripheral area comprises a plurality of first light shielding portions arranged at intervals, two adjacent first light shielding portions are connected by a second light shielding portion, wherein the second substrate has a light transmissive area, an orthographic projection of the second light shielding portion on the second substrate at least partly overlaps with the light transmissive area on the second substrate, the second light shielding portion is a laminated structure comprising a light transmissive sub-layer and a light shielding sub-layer, wherein the light shielding sub-layer is made of a same material as the first light shielding portion; and a thickness of the first light shielding portion is smaller than a thickness of the second light shielding portion; and wherein the light transmissive sub-layer is made of a same material as the filters located in the display area.

8. The display panel according to claim 7, wherein the second light shielding portion corresponds to an area on the second substrate without metal wires.

9. The display panel according to claim 7, wherein a size of the light transmissive sub-layer is approximately equal to a size of each filter corresponding to each sub-pixel unit in the display area.

10. A display device, comprising the display panel as claimed in claim 7.

11. The display device according to claim 10, wherein the second light shielding portion corresponds to an area on the second substrate not provided with metal wires.

12. The display device according to claim 10, wherein a size of the light transmissive sub-layer is equal to a size of each filter corresponding to each sub-pixel unit in the display area.

* * * * *